United States Patent [19]

Fukui et al.

[11] Patent Number: 4,673,712
[45] Date of Patent: Jun. 16, 1987

[54] PERFLUOROALKYLVINYL POLYMER AND PRODUCTION AND USE THEREOF

[75] Inventors: Shosin Fukui, Toyonaka; Masayoshi Shinjo, Settsu; Hirokazu Aoyama, Osaka; Yasuko Okazaki, Yamato-Kohriyama; Naonori Enjo, Suita; Kazunori Hayashi, Settsu, all of Japan

[73] Assignee: Daikin Industries Ltd., Osaka, Japan

[21] Appl. No.: 800,387

[22] Filed: Nov. 21, 1985

[30] Foreign Application Priority Data

Nov. 22, 1984 [JP] Japan ................................ 59-247803

[51] Int. Cl.$^4$ ............................................. C08F 14/18
[52] U.S. Cl. ................................................... 526/253
[58] Field of Search .......................................... 526/253

[56] References Cited

U.S. PATENT DOCUMENTS 4,381,387  4/1983  Sulzbach ............................ 526/253

Primary Examiner—Paul R. Michl
Assistant Examiner—Alex H. Walker
Attorney, Agent, or Firm—Birch, Stewart, Kolasch & Birch

[57] ABSTRACT

A perfluoroalkylvinyl copolymer comprising (a) repeating units of the formula:

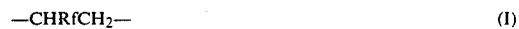

wherein Rf is a $C_5$–$C_{21}$ perfluoroalkyl group, and (b) repeating units of the formula:

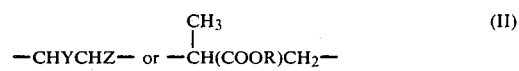

wherein Y is $-OR^1$, $-OCOR^1$ or $-COOR^1$ and Z is a hydrogen atom or $-COOR^2$ in which $R^1$ and $R^2$ are, the same or different, a $C_1$–$C_{18}$ alkyl group with the proviso that when Y is $-OR^1$ or $-OCOR^1$, Z is an hydrogen atom, and R is a $C_1$–$C_{18}$ alkyl group, which is useful as a mold release agent, a water- and oil-repellent and a non-tackifier.

12 Claims, No Drawings

PERFLUOROALKYLVINYL POLYMER AND PRODUCTION AND USE THEREOF

FIELD OF THE INVENTION

The present invention relates to a perfluoroalkylvinyl polymer and use thereof More particularly, it relates to a copolymer of perfluoroalkylvinyl and at least one comonomer copolymerizable therewith, and a mold release agent for rubber or plastics, water- and oil-repellents and a non-tackifier comprising the same.

SUMMARY OF THE INVENTION

One object of the present invention is to provide a novel copolymer comprising perfluoroalkylvinyl.

Another object of the present invention is to provide a novel copolymer comprising perfluoroalkylvinyl which is soluble in various organic solvents and useful as a mold release agent, a non-tackifier and a water- and oil-repellent.

These and other objects of the present invention are achieved by a perfluoroalkylvinyl copolymer comprising (a) repeating units of the formula:

$$-CHRfCH_2- \quad (I)$$

wherein Rf is a $C_5-C_{21}$ perfluoroalkyl group, and (b) repeating units of the formula:

$$-CHYCHZ- \text{ or } -\underset{\underset{CH_3}{|}}{C}(COOR)CH_2- \quad (II)$$

wherein Y is $-OR^1$, $-OCOR^1$ or $-COOR^1$ and Z is a hydrogen atom or $-COOR^2$ in which $R^1$ and $R^2$ are, the same or different, a $C_1-C_{18}$ alkyl group with the proviso that when Y is $-OR^1$ or $-OCOR^1$, Z is a hydrogen atom, and R is a $C_1-C_{18}$ alkyl group.

Usually, the copolymer of the present invention comprises at least 5% by weight, perferably at least 20% by weight of the repeating units (a) and at least 5% by weight, preferably at least 20% by weight of the repeating units (b), the total weight of the units (a) and (b) being at least 50% by weight, preferably at least 70% by weight. The repeating units (a) impart non-tackiness and water- and oil-repellency to the polymer, and the repeating units (b) improve the productivity and solubility of the polymer. The units (b) are contained in the polymer in the above range for structural reasons. The molecular weight of the perfluoroalkylvinyl copolymer of the present invention is usually from 700 to 50,000, preferably from 700 to 10,000. When the molecular weight is more than 10,000, the solubility of the copolymer in the solvent gradually decreases.

The number of carbon atoms contained in the group Rf is usually from 5 to 21, preferably from 8 to 16.

The copolymer of the present invention is a vinyl oligomer or a vinyl polymer having perfluoroalkyl groups as side chains and conveniently used for forming a coating film on various solid substrates. The coating film of the copolymer has low surface activity due to the perfluoroalkyl side chains and poor affinity with other compounds due to the absence of polarity in the main and side chains. Therefore, the copolymer of the present invention is particularly useful as a non-tackifier and/or a water- and oil-repellent.

The copolymer of the present invention may be produced by reacting, under polymerization conditions, a vinyl compound of the formula:

$$RfCH=CH_2 \quad (I')$$

wherein Rf is the same as defined above, and an alkyl vinyl ether, vinyl carboxylate, maleinate, acrylate or methacrylate of the formula:

$$CHY=CHZ \text{ or } CH_2=\underset{\underset{CH_3}{|}}{C}HCOOR \quad (II')$$

wherein R, Y and Z are the same as defined above.

The vinyl compound (I') as a starting material may be prepared by adding perfluoroalkyl halide of the formula:

$$RfX$$

wherein Rf is the same as defined above and X is a halogen atom to ethylene and dehydrogenhalogenating the addition product in the presence of alkali.

The above method of preparation the vinyl compound (I') is most suitable since the addition step and the vinylation step can be carried out in the same batch and the yields in both steps are very high. For example, when X is iodine, the yields reach 95% or higher.

When RfI and ethylene are used as starting materials, the reactions proceed as follows:

$$RfI + CH_2=CH_2 \rightarrow RfCH_2CH_2I \quad (1)$$

$$RfCH_2CH_2I + KOH \rightarrow RfCH=CH_2 + KI + H_2O \quad (2)$$

The addition reaction according to the formula (1) favorably proceeds in the presence of a radical generating source such as a peroxide, an azo compound, radioactive rays, light and heat. Preferably, the reaction is carried out in the presence of a radical initiator such as the peroxide and the azo compound. Although at a high temperature of about 200° C., the reaction proceeds in the absence of the radical initiator, the possibility of side reactions including coupling increases at a higher reaction temperature. Although the reaction can be initiated by irradiation of ultraviolet light at a room temperature, the reaction rate is very low and not suitable for commercial preparation. When the addition reaction is carried out in the presence of the radical initiator, a suitable reaction temperature is from 50° to 150° C., particularly from 80° to 110° C. The molar ratio of ethylene to RfI is preferably from 1:1 to 10:1, more preferably from 2:1 to 5:1. As the radical initiator, the peroxide such as t-butylperoxypropyl carbonate is particularly preferred.

The vinylation reaction (2) is preferably carried out by dehydrogenhalogenation of $RfCH_2CH_2X$ with alkali metal hydroxide (e.g. sodium hydroxide and potassium hydroxide). Dehydrogenhalogenation is preferably carried out at a temperature of 20° to 110° C., particularly 50° to 80° C.

Specific examples of the perfluoroalkylvinyl (I') are as follows:
$n-C_5F_{11}CH=CH_2$
$(CF_3)_2CF(CF_2)_2CH=CH_2$
$n-C_6F_{13}CH=CH_2$
$n-C_7F_{15}CH=CH_2$
$(CF_3)_2CF(CF_2)_4CH=CH_2$ n—$C_8F_{17}CH=CH_2$
n—$C_9F_{19}CH=CH_2$
$(CF_3)_2CF(CF_2)_6CH=CH_2$
$(CF_3)_2CF(CF_2)_8CH=CH_2$
$C_{12}F_{25}CH=CH_2$
$C_{13}F_{27}CH=CH_2$.

The perfluoroalkylvinyl (I') may be) used as a mixture of ones having different perfluoroalkyl groups with different numbers of carbon atoms.

Compounds copolymerizable with the vinyl compound (I') include alkyl acrylate, alkyl methacrylate, acrylonitrile, methacrylonitrile, vinyl ester of aliphatic acid, styrene, alkyl-substituted styrene, halogenated vinyl, halogenated vinylidene, allyl ester of aliphatic acid, vinyl alkyl ketone, vinyl alkyl ether and conjugated 1,3-diene. Specific examples thereof are methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecyl acrylate and methacrylate, lauryl acrylate and methacrylate, cetyl acrylate and methacrylate, stearyl acrylate and methacrylate, vinyl acetate, vinyl propionate, vinyl caprylate, vinyl laurate, vinylstearic acid, styrene, alpha-methylstyrene, beta-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro- 1,3-butadiene, isoprene, vinyl methyl ether, vinyl ethyl ether, vinyl butyl ether, vinyl decyl ether, vinyl stearyl ether and the like.

When the compound (II') is represented by the formula: $R^1OCH=CH_2$, it is alkyl vinyl ether, for example, methyl vinyl ether, ethyl vinyl ether, butyl vinyl ether, isobutyl vinyl ether, octadecyl vinyl ether, stearyl vinyl ether, chloromethyl vinyl ether, 2-chloroethyl vinyl ether and chloroporpyl vinyl ether.

Examples of the compound of the formula: $R^1COO—CH=CH_2$ are vinyl acetate, vinyl caprylate, vinyl stearate, vinyl butyrate, vinyl caproate and vinyl chloroacetate.

Examples of the compound of the formula: $R^1O-COCH=CHCOOR^2$ are dimethyl maleate, diethyl maleate, di- n-butyl maleate, di-2-ethylhexyl maleate and dinonyl maleate.

Examples of the compound of the formula: $R^1O-CO—CH=CH_2$ are stearyl acrylate and octadecyl acrylate.

Examples of the compound of the formula: $CH_2=C(CH_3)COOR$ are stearyl acrylate and octadecy methacrylate.

The copolymer of the present invention may further comprise at least one compound copolymerizable with the vinyl compound (I') which is not included in the compound (II').

The polymerization of the vinyl compound (I'), the compound (II') and the optional other copolymerizable compound is carried out by reacting the compounds in the presence of a polymerization initiator.

Specific examples of the polymerization initiator are benzoyl peroxide, lauroyl peroxide, t-butyl perbenzoate, 1-hydroxycyclohexyl hydroperoxide, 3-carboxypropionyl peroxide, peroxyacetyl, azobisisobutylamidine dihydrogen chloride, azobisisobutyronitrile, sodium peroxide, potassium persulfate, ammonium persulfate and the like. The polymerization may be initiated by irradiation of ionizable radiation such as gamma-rays.

In the polymerization method according to the present invention, any conventional mode of polymerization (e.g. bulk polymerization, solution polymerization, suspension polymerization, emulsion polymerization, radiation polymerization, photopolymerization and so on) may be employed.

The polymerization temperature is not critical and varies with the reactivity of the monomers to be polymerized. Usually, it is from 60° to 130° C.

The copolymer of the present invention contains two kinds of repeating units (a) and (b) in the backbone chain and is a white thermoplastic polymer. Its glass transition temperature varies with the kinds of the monomers and their proportions and usually in the range of from −90° to 100° C., particularly from 0° to 60° C.

The copolymer of the present invention is soluble in many organic solvents such as acetone, ethyl acetate, chloroform, trichlorotrifluoroethane, hexane, toluene and the like. The solubility of the copolymer depends on the kinds and proportion of the monomers.

One of the characteristics of the copolymer of the present invention is that the copolymer can impart water- and oil-repellency to a solid substrate by applying a solution or an aqueous emulsion of the copolymer on it. The solution or the aqueous emulsion of the copolymer may be casted to form a self-supporting film, which has water- and oil-repellency. Further, the copolymer may be used as a leveling agent of a coating when it is added to various solvents and liquid resins such as epoxy resin and polyester resin, and their surface tension can be reduced.

The copolymer of the present invention as such or in the form of the solution in the organic solvent or an aqueous emulsion has various applications. Particularly, it is useful as a water- and oil-repellent or a non-tackifier since the perfluoroalkyl side chain has low surface energy.

The water- and oil-repellent is an agent which reduces critical surface tension of a solid substrate and imparts to the substrate an ability to repel an aqueous material and/or an oily material. The aqueous material includes water, water soluble materials (e.g. alcohols, etc.) and their aqueous solution, and the oily material includes mineral oils (e.g., kerosene, fuel oil, gasoline, liquid paraffin, pitch, asphalt, etc.), vegetable oils (e.g., cotton seed oil, rape seed oil, etc.), and animal oils (e.g., whale oil, etc.). When the substrate is fiber or fabrics, the water- and oil-repellent prevent them from being stained with aqueous stain such as ink and sauce or oily stain such as frying oil and the mineral oil by repelling these. When paper or a sheet material is treated with the water- and oil-repellent, it is used as a wrapping material which can prevent penetration of asphalt or oils.

The non-tackifier is an agent which reduces the critical surface tension of a solid substrate and prevents it from sticking with a tacky material and includes a mold release agent, a backing agent, an agent for manufacturing a releasable paper, an anti-blocking agent, etc. The mold release agent is applied on a metal or wood mold, which is used for molding a rubber or a resin by spraying or coating to improve releasability of the molded article from the mold. The mold release agent includes a so-called internal mold release agent which is compounded in the rubber or resin to be molded. The backing agent and the agent for manufacturing the releasable paper includes one which is applied on a backing of a mending tape or adhesive tape to prevent permanent bonding of the wound tape and to make it easy to unwind the tape, and one which is used in manufacturing the releasable paper which is applied on the backing of a label or a plate or used in the production of a film and plywood. The anti-blocking agent is an agent which is used to prevent blocking of the sheets or films which are put in contact for a long time.

The water- and oil-repellent or the non-tackifier formulation comprising the copolymer of the present invention may be prepared by dissolving it in the organic solvent or diluting the reaction mixture containing it with the organic solvent. Specific examples of the organic solvent are acetone, methyl ethyl ketone, ethyl acetate, dimethylformamide, methylchloroform, trichloroethylene, trichlorotrifluoroethane, tetrachlorodifluoroethane, hexane, toluene, and mixtures thereof. An aerosol formulation may be prepared by adding an aerosol propellant (e.g., dichlorodifluoromethane, monofluorotrichloromethane, dimethyl ether, etc.) to the solution of the copolymer and filling it in a suitable vessel. The copolymer of the present invention may be used in the form of an aqueous emulsion thereof, which may be prepared by emulsifying it in an aqueous medium in the presence of a surfactant and optionally in the presence of various additives. The surfactant may be an anionic, nonionic or cationic one. The copolymer as such may be applied to the substrate.

Any composition of the copolymer of the present invention may be used as the water- and oil-repellent and the nontackifier. Preferably, the repeating unit (a) is contained in an amount not smaller than 5% by weight, preferably not smaller than 20% by mole.

The substrate to be treated by the water- and oil-repellent of the present invention includes various materials such as fiber, fabrics, paper, wood, leather, felt, asbestos and bricks, and further metals, tiles, plastics and their coated surfaces. Examples of the fiber and fabrics are natural fiber (e.g., cotton, jute, wool, silk, etc.), synthetic fiber (e.g., polyamide, polyester, polyvinyl acetal, polyacrylonitrile, polyvinyl chloride, polypropylene, etc.), semi-synthetic fiber (e.g., rayon, acetate, etc.) and inorganic fiber (e.g., glass fiber, asbestos fiber, etc.), blended fiber thereof and fabrics thereof.

The substrate to which the non-tackiness is imparted by the copolymer of the present invention includes the same material as is treated by the water- and oil-repellent of the present invention. Particularly, the natural and synthetic resins (e.g., polyurethane resin, epoxy resin, phenol resin, polyvinyl chloride resin, acrylic resin, etc.), natural and synthetic elastomers (e.g., natural rubber, chloroprene rubber, fluorine-containing rubber, etc.). The mold release agent of the present invention is applied to any mold including a metal, wooden plastic or paper mold and used in the treatment of the backing of the adhesive tape made of paper, cellophane, cloth or plastics and the production of the released paper for the label or wrapper.

The concentration of the copolymer in the water- and oil-repellent is not critical and usually from 0.01 to 30% by weight, preferably from 0.1 to 2.0% by weight. When the concentration is too low, the water- and oil-repellecy is not sufficiently imparted, and when it is too high, it is economically unfavorable. If desired, the water- and oil-repellent of the present invention may contain an antistatic additive, a flame retardant, a crease resisting agent, a film-forming resin (e.g., acrylic resin, vinyl acetate resin, etc.) and/or fine powder of silicon oxide, polytetrafluoroethylene, etc.

When the non-tackifier is used as the mold release agent for a mold used only one time, the concentration of the copolymer may be 0.01% or less. However, when the mold release effect is expected several times, the concentration is preferably from 0.05 to 30% by weight, more preferably from 0.1 to 10% by weight. The concentration of the copolymer in the backing treating agent or the anti-blocking agent is the same as in the mold release agent. When the copolymer is used as the internal mold release agent, it is added to the material to be molded in an amount of 0.05 to 10% by weight, preferably form 0.1 to 3% by weight of the weight of the resin. If desired, the water- and oil-repellent of the present invention may contain an antistatic additive, a flame retardant, a crease resisting agent, a film-forming resin (e.g., acrylic resin, vinyl acetate resin, etc.) and/or fine powder of silicon oxide, polytetrafluoroethylene, etc. The non-tackifier of the present invention may contain the above film-forming resin, a coating (e.g., lacquer, a polyvinyl chloride coating, etc.), the fine powder and/or an oil (e.g., silicone oil, fluorine-containing oil, etc.).

The water- and oil-repellent and the non-tackifier of the present invention is applied to the substrate in a suitable manner depending on the kind and field of use of the substrate, end use and the form of the agent. When it is in the form of a solution or an emulsion, it is applied on the surface of the substrate by spraying, dipping or coating, dried and optionally cured. When it is in the form of an aerosol, it is sprayed on the surface of the substrate and dried and optionally cured.

The present invention will be hereinafter explained further, in detail by the following Examples, in which % and parts are by weight unless otherwise indicated.

In Examples, water-repellency is expressed by a "Water-repellency Number" of Table 1 determined according to the spray method of JIS (Japanese Industrial Standards) L-1005, and the oil-repellency is expressed by "Oil-repellency Number" of Table 2 determined by dropping a mixture of n-heptane and Nujol having a composition shown in Table 2 on the surface of a sample cloth previously treated with the test material and observing the retention of the drop over a period of 3 minutes.

TABLE 1

| Water-repellency No. | State |
| --- | --- |
| 100 | Not wet on the surface |
| 90 | Slightly wet on the surface |
| 80 | Partially wet on the surface |
| 70 | Wet on the surface |
| 50 | Wet over the whole surface |
| 0 | Completely wet through the surface to the reverse |

TABLE 2

| Oil-repellency Number | Mixture composition (% by volume) | |
| --- | --- | --- |
| | n-Heptane | Nujol |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |

TABLE 2-continued

| Oil-repellency Number | Mixture composition (% by volume) | |
|---|---|---|
| | n-Heptane | Nujol |
| 60 | 10 | 90 |
| 50 | 0 | 100 |
| 0 | (100% Nujol not retained) | |

EXAMPLE 1

(A) To a 100 ml flask equipped with a reflux condenser and a stirrer, a compound of the formula:

$$CF_3CF_2(CF_2CF_2)_3CH_2CH_2I \quad (1)$$

(260 g) and methanol (95 g) were charged and stirred. After adjusting the temperature of the flask interior at 65° C., a solution of potassium hydroxide (33 g) in methanol (150 g) was dropwise added over 20 minutes and reacted for 4 hours. Gas chromatographic analysis revealed that the conversion of Compound (1) to $CF_3CF_2(CF_2CF_2)_3CH=CH_2$ (Compound (2)) was 100%.

Then, the reaction mixture was kept standing to separate into two phases and the upper methanol phase was removed. The reaction product in the flask was washed with water (400 g) to obtain a transparent liquid compound (II) (195 g). Yield 97.5%.

(B) Compound (2) (100 g) was charged in a 4 liter flask equipped with a reflux condenser and a stirrer in a nitrogen atmosphere and stirred. After adjusting the temperature of the flask interior at 110° C., t-butylperoxypropyl carbonate (5 ml) was added to initiate polymerization. The reaction was continued at 110° C. for 10 hours. Conversion of Compound (2) was 99.7%.

The reaction product was poured in methanol to precipitate a white solid, which was dissolved in trichlorotrifluoroethane and again poured in methanol to precipitate a white solid polymer (76.2 g). Yield 76.2%. $T_g$ 21.6° C.

$^1$H-NMR spectrum analysis of the product revealed that the chemical shift at 5.7–6.1 ppm corresponding to the protons *A of the following formula disappeared and that at 1.1–3.0 ppm corresponding to the protons *B appeared. This confirmed the formation of the polymer.

$$CF_3CF_2(CF_2CF_2)_3CH=CH_2$$
*A

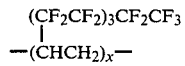
*B

By liquid chromatographic analysis, a number average molecular weight was found to be 2,700, from which x was calculated to be about 6.0.

| Elementary analysis: | C | F | H |
|---|---|---|---|
| Calc'd: | 27.1 | 71.2 | 1.0 |
| Found: | 26.9 | 72.4 | 0.7 |

EXAMPLE 2

(A) To a 3 liter flask equipped with a reflux condenser and a stirrer, a compound mixture of the formula:

$$CF_3CF_2(CF_2CF_2)_mCH_2CH_2I \quad (3)$$

(m=3, 61.17% by mole; m=4, 24.9% by mole; m=5, 9.24% by mole; m=6, 3.24% by mole; m=7, 1.09% by mole; m=8, 0.37% by mole) (1.25 kg) was charged and, after heating to 65° C., stirred. A solution of potassium hydroxide (140 g) in methanol (625 g) was dropwise added over 20 minutes and reacted for 6 hours. Gas chromatographic analysis revealed that the conversion of Compound (3) was 100%.

Then, the reaction mixture was kept standing to separate into two phases and the lower transparent phase (964 g) was recovered. The recovered liquid was charged in a 1 liter flask and subjected to simple distillation at a flask temperature of 150° C. and a maximum temperature of 100° C. under reduced pressure of 200 mmHg to 5 mmHg to obtain a compound mixture of the formula:

$$CF_3CF_2(CF_2CF_2)_nCH=CH_2 \quad (4)$$

(n=3, 61.94% by mole; n=4, 27.89% by mole; n=5, 8.89% by mole; n=6, 1.20% by mole; n=7, 0.08) (892 g). Yield 89.2%.

(B) Compound (4) (100 g) and vinyl acetate (17.4 g) were charged in a 200 ml flask equipped with a reflux condenser and a stirrer in a nitrogen atmosphere and stirred. After adjusting the temperature of the flask interior at 110° C. t-butylperoxypropyl carbonate (7 ml) was added to initiate polymerization. The reaction was continued at 110° C. for 2 hours. Conversions of Compound (4) and vinyl acetate were both 100%.

The reaction mixture was heated to 70° C. to evaporate the solvent, and a liquid residue was recovered and cooled to a room temperature to obtain a transparent greasy product (114.8 g). Yield 97.8%. $T_g$ 12.5° C.

From signal strength per proton *A and *B obtained in $^1$H-NMR analysis of the product, x and y in the following formula were calculated to be 1 and 2.06, respectively.

*A

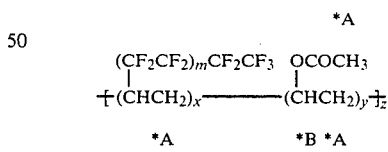

*A    *B *A

By liquid chromatographic analysis, the number average molecular weight was found to be 2,150, from which z s calculated to be about 3.2.

| Elementary analysis: | C | F | H |
|---|---|---|---|
| Calc'd: | 34.8 | 52.9 | 2.6 |
| Found: | 34.1 | 54.0 | 2.3 |

EXAMPLES 3–13

In the same manner as in Example 1 or 2 but using the monomers in the amounts shown in Table 1 and polymerizing them under the specified conditions, a polymer was prepared.

The results are shown in Table 3.

TABLE 3

| Example No. | Monomer Compound | Amount (g) | Molar ratio | Solvent (g)*1 | Catalyst (g)*2 | Temp. (°C.) | Time (hr.) | Conversion % | Yield (g) | Tg (°C.) | Appearance |
|---|---|---|---|---|---|---|---|---|---|---|---|
| 3 | (4)<br>$(CH_3)_2CHCH_2OCH=CH_2$ | 16.64<br>3.36 | 1<br>1 | 4 | 1.2 | 100 | 2 | 100<br>100 | 98.4 | 16.7 | Pale yellow grease |
| 4 | (4)<br>$CH_3(CH_2)_{17}OCH=CH_2$ | 12.53<br>7.47 | 1<br>1 | — | 1.4 | 110 | 6 | 100<br>91.5 | 95.6 | 23.2 | Pale yellow grease |
| 5 | (4)<br>$CH_3COOCH=CH_2$ | 17.04<br>2.96 | 1<br>1 | — | 1.2 | 110 | 2 | 100<br>98 | 97.8 | 12.5 | Very viscoius transparent liquid |
| 6 | (4)<br>$CH_3(CH_2)_6COOCH=CH_2$ | 14.9<br>5.1 | 1<br>1 | — | 1.1 | 110 | 1 | 97.6<br>99 | 96.5 | −6 | Very viscoius transparent liquid |
| 7 | (4)<br>$CH_3(CH_2)_{16}COOCH=CH_2$ | 12.31<br>7.69 | 1<br>1 | 4 | 0.9 | 110 | 1 | 100<br>100 | 98.6 | 48.9 | White solid |
| 8 | (4)<br>$CH_3(CH_2)_{16}COOCH=CH_2$ | 7.56<br>2.43 | 2<br>1 | 2 | 0.45 | 120 | 1 | 100<br>100 | 98.2 | 44.2 | White solid |
| 9 | (4)<br>$CH_3(CH_2)_{16}COOCH=CH_2$ | 2.47<br>7.53 | 1<br>4.9 | 2 | 0.45 | 120 | 1 | 100<br>100 | 98.9 | 62.7 | White solid |
| 10 | (4) | 20 |  | 4 | 0.73 | 110 | 5 | 99.5 | 98.6 | 32.5 | White solid |
| 11 | (4)<br>$CHCOOC_4H_9$<br>$CHCOOC_4H_9$ | 13.7<br>6.3 | 1<br>1 | — | 1.4 | 110 | 31 | 98.5<br>98.0 | 90.5 | 1.7 | Pale yellow grease |
| 12 | (4)<br>$CHCOOC_9H_{19}$<br>$CHCOOC_9H_{19}$ | 34.42<br>25.58 | 1<br>1 | — | 3.42 | 110 | 20 | 78<br>91.2 | 82.0 | 4.0 | Pale yellow grease |
| 13 | (4)<br>$CH_3(CH_2)_{16}OCOCH=CH_2$ | 12.1<br>7.9 | 1<br>1 | 4 | 1.2 | 110 | 1 | 95.9<br>100 | 97.6 | 52 | White solid |
| 14 | (4)<br>$CH_3(CH_2)_{16}OCOC(CH_3)=CH_2$ | 12.1<br>8.2 | 1<br>1 | 4 | 1.2 | 110 | 1 | 94.6<br>100 | 96.2 | 50 | White solid |

Note:
[1]Propypglyocol monomethyl ether.
[2]t-Butylperoxypropyl carbonate.

Applications of the copolymers of the present invention will be hereinafter illustrated.

1. Water- and Oil- Repellent for Fabric

Each copolymer prepared in Examples 4–14 was dissolved in a mixed solvent of acetone (20%) and trichlorotrifluoroethane (80%) in a solid content of 1%. Polyester amunzen fabric was dipped in a weight of the resulting solution equal to the fabric weight, squeezed by a mangle and dried at 100° C. for 3 minutes. The water- and oil-repellency of the thus treated fabric were evaluated. The results are shown in Table 4.

TABLE 4

| Copolymer | Water repellency | Oil repellency |
|---|---|---|
| Example 4 | 80 | 70 |
| Example 5 | 80 | 90 |
| Example 6 | 70 | 70 |
| Example 7 | 100 | 110 |
| Example 10 | 100 | 110 |
| Example 13 | 100 | 110 |
| Example 14 | 100 | 110 |
| No treatment | 0 | 0 |

2. Contact Angle

On various substrates, a 1% solution of the copolymer of the present invention in the same mixed solvent as used in the above was coated and dried, and contact angles of water and n-hexadecane against the coated surface were measured. The results are shown in Table 5.

TABLE 5

| | Water (°) | n-Hexadecane (°) |
|---|---|---|
| Aluminum | | |
| No treatment | 15 | 10 or smaller |
| Example 7 | 117 | 35 |
| Example 10 | 122 | 85 |
| Glass plate | | |
| No treatment | 10 | 10 or smaller |
| Example 5 | 117 | 72 |
| Polyester film | | |
| No treatment | 38 | 10 or smaller |
| Example 10 | 119 | 82 |

3. Mold Release Agent

On an inner surface of an aluminum made mold (6 cm in diameter and 3 cm in length), a 2% solution of the copolymer of the present invention in a solvent shown in Table 6 or a commercially available mold release agent was coated and dried at room temperature. In the cavity of the thus coated mold, there was poured a mixture prepared by mixing the following Compositions A and B at 5,000 rpm for 10 seconds:

| | Parts |
|---|---|
| Composition A | |
| Sumisen 3900*1 (polyol) | 90 |
| Water (foaming agent) | 1.6 |
| Triethanolamine (catalyst) | 3 |
| Triethylamine (catalyst) | 0.5 |
| Kaolizer No. 1*2 (foam stabilizer) | 0.5 |
| Composition B | |
| Sumijuru 44V-20*3 (isocyanate) | 41.3 |

Note:
[1] and [3]Manufactured by Sumitomo Bayer Urethane Co., Ltd.
[2]Manufactured by Kao Corporation.

The mixture was cured for 10 minutes and mold releasing property was evaluated by measuring peel strength with a tensile tester. The results are shown in Table 6.

TABLE 6

| Copolymer (Amount) | Other ingredient (Amount) | Solvent | Peel strength (g/cm²) |
|---|---|---|---|
| Example 4 (2%) | | S-3*¹ 48% n-Hexane 50% | 56 |
| Example 5 (2%) | | S-3 48% n-Hexane 50% | 88 |
| Example 13 (2%) | | S-3 48% n-Hexane 50% | 78 |
| Example 7 (2%) | | S-3 80% Acetone 18% | 52 |
| Example 10 (2%) | | S-3 80% Acetone 18% | 49 |
| Example 9 (2%) | | n-Hexane 98% | 67 |
| Example 7 (0.5%) | Dimethylsiloxane oil 1.0% Silicone varnish 0.5% | S-3 90% Acetone 8% | 18 |
| Example 4 (1%) | Carnauba wax 1% | S-3 30% n-Hexadecane 68% | 41 |
| Commercially available wax type mold release agent | | | 130 |
| Commercially available silicone type mold release agent | | | 70 |

Note:
¹1,1,2-trifluoro-1,2,2-trichloroethane.

4. Internal Mold Release Agent 0.2 Part of the polymer prepared in Example 4 or 12 and 100 parts of Epikote 828 (Epoxy resin manufactured by Shell Chemical) were mixed and, then, 10 parts of triethylenetetramine was mixed. The thus obtained mixture was charged in a mold (4 cm in inner diameter and 2 mm in depth) which had been cleaned but not coated with any mold release agent. Thereafter, the mold containing the mixture was kept standing at a room temperature for 2 hours and then cured at 100° C. for 1 hour. The cured mixture was easily removed from the mold.

The contact angles of water and n-hexadecane against the cured articles were 119° and 67°, respectively.

When any polymer was not mixed in the epoxy resin, the cured article was firmly bonded to the mold.

5 Release Agent

180° Peel strength was measured with the copolymers prepared in Examples 4, 7 and 11.

The copolymer was dissolved in a solvent shown in Table 7 in a concentration of 2%. The thus prepared solution was coated on a polyester film by means of a bar coater No. 8 and dried. After load was applied at 20° C. for 20 hours, 180° peel strength was measured by using a polyester tape (manufactured by Nitto Electric Industries). The results are shown in Table 7.

TABLE 7

| Copolymer | Solvent | Peel strength (g/cm²) |
|---|---|---|
| Example 4 | Trichlorotrifluoroethane 30% Acetone 70% | 28 |
| Example 7 | Trichlorotrifluoroethane 50% Acetone 50% | 32 |
| Example 10 | n-Hexane 50% Trichlorotrifluoroethane 50% | 54 |
| Not treated | | 405 |

6. Additive for Coating (Anti-blocking and Soil resistance)

100 Parts of a vinyl chloride coating (Vinylose manufactured by Dainippon Paint) and 5 parts of a 10% solution of the copolymer prepared in Example 9 in n-hexane were mixed and coated by means of a bar coater No. 8 on a decorative laminated plywood and dried.

For comparison, a mixture of 100 parts of the same vinyl chloride coating and 5 parts of n-hexane was prepared and coated on the same plywood and dried.

On the thus coated plywood, a cellophane mending tape (manufactured by Nichiban) of 18 mm wide was strongly pressed with a finger and quickly peeled off. This procedure was repeated. While the surface of the coating not containing the copolymer of the invention was peeled off after one time, the surface of the coating containing the copolymer of the invention was not peeled off after six time.

The surface of the coated plywood was stained with soot accumulated in a muffler of an automobile and wiped by cloth. The surface of the plywood coated with the coating containing the copolymer of the invention was less contaminated and cleaned by wiping while that coated with the coating not containing the copolymer was blackly contaminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A perfluoroalkylvinyl copolymer comprising: at least 5% by weight of repeating units of the formula:

$$-CHRfCH_2- \quad (I)$$

wherein Rf is a $C_5$–$C_{21}$ perfluoroalkyl group; and at least 5% by weight of repeating units of the formula:

$$-CHYCHZ- \text{ or } -\underset{\underset{CH_3}{|}}{CH}(COOR)CH_2- \quad (II)$$

wherein Y is $-OR^1$, $-OCOR^1$ or $-COOR^1$ and Z is a hydrogen atom or $-COOR^2$ in which $R^1$ and $R^2$ are, the same or different, a $C_1$–$C_{18}$ alkyl group and the total weight of the units I and II is at least 50% by weight, with the proviso that when Y is $-OR^1$ or $-OCOR^1$, Z is a hydrogen atom, and R is a $C_1$–$C_{18}$ alkyl group.

2. The coplymer according to claim 1, which has a molecular weight of from 700 to 50,000, prederably from 700 to 10,000.

3. The copolymer according to claim 1, wherein Rf has 8 to 16 carbon atoms.

4. A process for preparing a perfluoroalkylvinyl copolymer according to claim 1, comprising reacting, under polymerization conditions, a vinyl compound of the formula:

$$RfCH=CH_2 \quad (I')$$

wherein Rf is the same as defined above, and an alkyl vinyl ether, vinyl carboxylate, maleinate, acrylate or methacrylate of the formula:

$$CHY=CHZ \text{ or } CH_2=\overset{\underset{\displaystyle CH_3}{|}}{C}HCOOR \quad (II')$$

wherein R, Y and Z are the same as defined above.

5. The process according to claim 4, wherein the reaction temperature is from 60° to 130° C.

6. The process according to claim 4, wherein the vinyl compound (I') is at least one compound selected from the group consisting of $n$—$C_5F_{11}CH=CH_2$
$(CF_3)_2CF(CF_2)_2CH=CH_2$
$n$—$C_6F_{13}CH=CH_2$
$n$—$C_7F_{15}CH=CH_2$
$(CF_3)_2CF(CF_2)_4CH=CH_2$
$n$—$C_8F_{17}CH=CH_2$
$n$—$C_9F_{19}CH=CH_2$
$(CF_3)_2CF(CF_2)_6CH=CH_2$
$(CF_3)_2CF(CF_2)_8CH=CH_2$
$C_{12}F_{25}CH=CH_2$ and
$C_{13}F_{27}CH=CH_2$.

7. The process according to claim 4, wherein the reaction is initiated by a polymerization initiator.

8. The process according to claim 4, wherein the polymerization initiator is a organic peroxide.

9. A mold release agent for rubber or plastics comprising, as an active ingredient, a perfluoroalkylvinyl copolymer according to claim 1.

10. A water- and oil-repellent comprising, as an active ingredient, a perfluoroalkylvinyl copolymer according to claim 1.

11. A non-tackifier comprising, as an active ingredient, a perfluoroalkylvinyl copolymer according to claim 1.

12. The copolymer according to claim 1, wherein the total weight of the units I and II is at least 70% by weight.

* * * * *

UNITED STATES PATENT AND TRADEMARK OFFICE
CERTIFICATE OF CORRECTION

PATENT NO. : 4,673,712

DATED : June 16, 1987

INVENTOR(S) : Fukui et al

It is certified that error appears in the above-identified patent and that said Letters Patent is hereby corrected as shown below:

In the Abstract:

Line 6 (counting formulas as one line each)

Delete the formula and substitute the following therefor --

$$--CHYCHZ - \text{or} - \underset{|}{\overset{CH_3}{C}}(COOR)CH_2--$$

In the Specification

Column 2, Line 11 (counting formulas as one line each)

Delete the formula and substitute the following therefor $$--CHY=CHZ \text{ or } CH_2=\underset{|}{\overset{CH_3}{C}}COOR--$$

In the Claims

Claim 1, Line 6 (counting formulas as one line each)

Delete the formula and substitute the following therefor $$--CHYCHZ- \text{ or } - \underset{|}{\overset{CH_3}{C}}(COOR)CH_2- --$$

Claim 4, Line 9 (counting formulas as one line each)

UNITED STATES PATENT AND TRADEMARK OFFICE
CERTIFICATE OF CORRECTION

PATENT NO. : 4,673,712
DATED : June 16, 1987
INVENTOR(S) : Fukui et al

Page 2 of 2

It is certified that error appears in the above-identified patent and that said Letters Patent is hereby corrected as shown below:

Delete the formula and substitute the following therefor $$--CHY=CHZ \text{ or } CH_2=\overset{CH_3}{\underset{|}{C}}COOR--$$

Signed and Sealed this

Eleventh Day of April, 1989

Attest:

DONALD J. QUIGG

*Attesting Officer*     *Commissioner of Patents and Trademarks*